(12) United States Patent
Huang et al.

(10) Patent No.: US 7,383,181 B2
(45) Date of Patent: Jun. 3, 2008

(54) MULTI-SENSORY SPEECH DETECTION SYSTEM

(75) Inventors: Xuedong D. Huang, Bellevue, WA (US); Zicheng Liu, Bellevue, WA (US); Zhengyou Zhang, Redmond, WA (US); Michael J. Sinclair, Kirkland, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 788 days.

(21) Appl. No.: 10/629,278

(22) Filed: Jul. 29, 2003

(65) Prior Publication Data

US 2005/0027515 A1 Feb. 3, 2005

(51) Int. Cl.
*G10L 15/00* (2006.01)

(52) U.S. Cl. ............... 704/231; 704/270; 704/270.1

(58) Field of Classification Search ............. 704/251, 704/270, 233, 275, 270.1, 231, 236, 246; 381/327, 318
See application file for complete search history.

(56) References Cited

U.S. PATENT DOCUMENTS

| | | | |
|---|---|---|---|
| 3,383,466 A | 5/1968 | Hilix et al. ............... 179/1 |
| 3,746,789 A | 7/1973 | Alcivar ............... 179/1 |
| 3,787,641 A | 1/1974 | Santori ............... 179/107 |
| 4,382,164 A | 5/1983 | May, Jr. ............... 704/233 |
| 4,769,845 A | 9/1988 | Nakamura ............... 704/231 |
| 5,054,079 A | 10/1991 | Frielingsdorf et al. ...... 381/151 |
| 5,151,944 A | 9/1992 | Yamamura ............... 381/151 |
| 5,197,091 A | 3/1993 | Takagi et al. ............ 379/433.12 |
| 5,295,193 A | 3/1994 | Ono ............... 381/151 |
| 5,404,577 A | 4/1995 | Zuckerman et al. ............ 455/66 |
| 5,446,789 A | 8/1995 | Loy et al. |
| H1497 H | 10/1995 | Marshall ............... 704/276 |
| 5,555,449 A | 9/1996 | Kim ............... 379/433.03 |
| 5,590,241 A | 12/1996 | Park et al. ............... 704/227 |
| 5,647,834 A | 7/1997 | Ron ............... 600/23 |
| 5,692,059 A | 11/1997 | Kruger ............... 381/151 |
| 5,701,390 A | 12/1997 | Griffin et al. ............... 704/206 |

(Continued)

FOREIGN PATENT DOCUMENTS

DE 199 17 169 11/2000

(Continued)

OTHER PUBLICATIONS

Bakar, "The Insight of Wireless Communication," Research and Development, 2002, Student Conference on Jul. 16-17, 2002.

(Continued)

*Primary Examiner*—Huyen X. Vo
(74) *Attorney, Agent, or Firm*—Joseph R. Kelly; Westman, Champlin & Kelly, P.A.

(57) ABSTRACT

The present invention combines a conventional audio microphone with an additional speech sensor that provides a speech sensor signal based on an input. The speech sensor signal is generated based on an action undertaken by a speaker during speech, such as facial movement, bone vibration, throat vibration, throat impedance changes, etc. A speech detector component receives an input from the speech sensor and outputs a speech detection signal indicative of whether a user is speaking. The speech detector generates the speech detection signal based on the microphone signal and the speech sensor signal.

13 Claims, 8 Drawing Sheets

U.S. PATENT DOCUMENTS

| | | | |
|---|---|---|---|
| 5,757,934 A | 5/1998 | Yokoi | 381/68.3 |
| 5,812,970 A | 9/1998 | Chan et al. | 704/226 |
| 5,828,768 A | 10/1998 | Eatwell et al. | 381/333 |
| 5,873,728 A | 2/1999 | Jeong | 434/185 |
| 5,933,506 A | 8/1999 | Aoki et al. | 381/151 |
| 5,943,627 A | 8/1999 | Kim et al. | 379/426 |
| 5,983,073 A | 11/1999 | Ditzik | 455/11.1 |
| 5,983,186 A | 11/1999 | Miyazawa et al. | 704/275 |
| 6,006,175 A | 12/1999 | Holzrichter | 704/208 |
| 6,028,556 A | 2/2000 | Shiraki | 343/702 |
| 6,052,464 A | 4/2000 | Harris et al. | 379/433 |
| 6,052,567 A | 4/2000 | Ito et al. | 455/90 |
| 6,091,972 A | 7/2000 | Ogasawara | 455/575.7 |
| 6,094,492 A | 7/2000 | Boesen | 381/312 |
| 6,125,284 A | 9/2000 | Moore et al. | 455/557 |
| 6,137,883 A | 10/2000 | Kaschke et al. | 379/433.07 |
| 6,151,397 A | 11/2000 | Jackson et al. | 381/71.4 |
| 6,175,633 B1 | 1/2001 | Morrill et al. | 381/71.6 |
| 6,243,596 B1 | 6/2001 | Kikinis | 429/8 |
| 6,266,422 B1 | 7/2001 | Ikeda | 381/71.11 |
| 6,292,674 B1 | 9/2001 | Davis | 455/550.1 |
| 6,308,062 B1 | 10/2001 | Chien et al. | 455/420 |
| 6,339,706 B1 | 1/2002 | Tillgren et al. | 455/419 |
| 6,343,269 B1 | 1/2002 | Harada et al. | 704/243 |
| 6,377,919 B1 | 4/2002 | Burnett et al. | 704/231 |
| 6,408,081 B1 | 6/2002 | Boesen | 381/312 |
| 6,411,933 B1 | 6/2002 | Maes et al. | 704/270 |
| 6,434,239 B1 | 8/2002 | DeLuca | 381/71.2 |
| 6,542,721 B2 | 4/2003 | Boesen | 455/90 |
| 6,560,468 B1 | 5/2003 | Boesen | 455/568 |
| 6,590,651 B1 | 7/2003 | Bambot et al. | 356/338 |
| 6,594,629 B1* | 7/2003 | Basu et al. | 704/251 |
| 6,664,713 B2 | 12/2003 | Boesen | 310/328 |
| 6,675,027 B1 | 1/2004 | Huang | 455/575 |
| 6,707,921 B2* | 3/2004 | Moore | 381/327 |
| 6,717,991 B1 | 4/2004 | Gustafsson et al. | 375/285 |
| 6,738,485 B1 | 5/2004 | Boesen | 381/312 |
| 6,754,358 B1 | 6/2004 | Bossen et al. | 381/326 |
| 6,760,600 B2 | 7/2004 | Nickum | 455/557 |
| 6,959,276 B2 | 10/2005 | Droppo et al. | 704/226 |
| 7,054,423 B2 | 5/2006 | Nebiker et al. | 379/201.01 |
| 7,110,944 B2 | 9/2006 | Balan et al. | 704/226 |
| 7,117,148 B2 | 10/2006 | Droppo et al. | 704/228 |
| 7,120,477 B2 | 10/2006 | Huang | 455/575.7 |
| 7,181,390 B2 | 2/2007 | Droppo et al. | 704/226 |
| 7,190,797 B1 | 3/2007 | Johnston et al. | 381/74 |
| 2001/0027121 A1 | 10/2001 | Boesen | 455/556 |
| 2001/0039195 A1 | 11/2001 | Nickum | 455/557 |
| 2001/0044318 A1 | 11/2001 | Mantyjarvi et al. | 455/550 |
| 2002/0057810 A1 | 5/2002 | Boesen | |
| 2002/0068537 A1 | 6/2002 | Shim et al. | 455/177.1 |
| 2002/0075306 A1 | 6/2002 | Thompson et al. | |
| 2002/0114472 A1 | 8/2002 | Lee et al. | 381/71.12 |
| 2002/0118852 A1 | 8/2002 | Boesen | 381/328 |
| 2002/0173953 A1 | 11/2002 | Frey et al. | 704/226 |
| 2002/0181669 A1 | 12/2002 | Takatori et al. | |
| 2002/0196955 A1 | 12/2002 | Boesen | |
| 2002/0198021 A1 | 12/2002 | Boesen | 455/556 |
| 2003/0061037 A1 | 3/2003 | Droppo et al. | 704/226 |
| 2003/0083112 A1 | 5/2003 | Fukuda | 455/568 |
| 2003/0097254 A1 | 5/2003 | Holzrichter et al. | 704/201 |
| 2003/0125081 A1 | 7/2003 | Boesen | 455/556 |
| 2003/0144844 A1 | 7/2003 | Colmenarez et al. | 704/273 |
| 2003/0179888 A1 | 9/2003 | Brunett et al. | 381/71.8 |
| 2004/0028154 A1 | 2/2004 | Yellin et al. | 375/341 |
| 2004/0086137 A1 | 5/2004 | Yu et al. | 381/71.11 |
| 2004/0092297 A1 | 5/2004 | Huang | |
| 2004/0186710 A1 | 9/2004 | Yang | 704/226 |
| 2004/0249633 A1 | 12/2004 | Asseily et al. | 704/200 |
| 2005/0038659 A1 | 2/2005 | Helbing | 704/271 |
| 2005/0114124 A1 | 5/2005 | Liu et al. | 704/228 |
| 2006/0008256 A1 | 1/2006 | Khedouri et al. | 386/124 |
| 2006/0009156 A1 | 1/2006 | Hayes et al. | 455/63.1 |
| 2006/0072767 A1 | 4/2006 | Zhang et al. | |
| 2006/0079291 A1 | 4/2006 | Granovetter et al. | |

FOREIGN PATENT DOCUMENTS

| | | |
|---|---|---|
| EP | 0 720 338 A2 | 7/1996 |
| EP | 742 678 | 11/1996 |
| EP | 0 854 535 A2 | 7/1998 |
| EP | 0 939 534 A1 | 9/1999 |
| EP | 0 951 883 | 10/1999 |
| EP | 1 333 650 | 8/2003 |
| EP | 1 569 422 | 8/2005 |
| EP | 05101071.8 | 7/2007 |
| FR | 2 761 800 | 4/1997 |
| FR | 2761800 A1 | 4/1997 |
| GB | 2 375 276 | 11/2002 |
| GB | 2 390 264 | 12/2003 |
| JP | 3108997 | 5/1991 |
| JP | 4245720 | 9/1992 |
| JP | 5276587 | 10/1993 |
| JP | 8065781 | 3/1996 |
| JP | 8070344 | 3/1996 |
| JP | 8079868 | 3/1996 |
| JP | 8214391 | 8/1996 |
| JP | 9284877 | 10/1997 |
| JP | 10-023122 | 1/1998 |
| JP | 10-023123 | 1/1998 |
| JP | 11265199 | 9/1999 |
| JP | 2001119797 | 10/1999 |
| JP | 2001245397 | 2/2000 |
| JP | 20002-09688 | 7/2000 |
| JP | 2000196723 | 7/2000 |
| JP | 2000250577 | 9/2000 |
| JP | 2000261529 | 9/2000 |
| JP | 2000261530 | 9/2000 |
| JP | 2000261534 | 9/2000 |
| JP | 2000354284 | 12/2000 |
| JP | HP 2000354284 | 12/2000 |
| JP | 2001292489 | 10/2001 |
| JP | 2002-125298 | 4/2002 |
| JP | 2002-358089 | 12/2002 |
| JP | 2003143253 | 5/2003 |
| WO | WO 93/01664 | 1/1993 |
| WO | WO 95/17746 | 6/1995 |
| WO | WO 99/04500 | 1/1999 |
| WO | WO 00/21194 | 10/1999 |
| WO | WO 00/21194 | 4/2000 |
| WO | WO 02/021194 | 4/2000 |
| WO | WO 00/45248 | 8/2000 |
| WO | WO 02/007477 | 1/2002 |
| WO | WO 02/077972 A1 | 10/2002 |
| WO | WO 02/098169 A1 | 12/2002 |
| WO | WO 03/055270 A1 | 7/2003 |
| WO | WO 2004/012477 | 2/2004 |

OTHER PUBLICATIONS

P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.

M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.

European Search Report from Application No. 05107921.8, filed Aug. 30, 2005.

European Search Report from Application No. 05108871.4, filed Sep. 26, 2005.

http://www.snaptrack.com/ (2004).

http://www.misumi.com.tw/PLIST.ASP?PC.ID:21 (2004).

http://www.wherifywireless.com/univLoc.asp (2001).

http://www.wherifywireless.com/prod.watches.htm (2001).

Microsoft Office, Live Communications Server 2003, Microsoft Corporation, pp. 1-10, 2003.

Shoshana Berger, http://www.cnn.com/technology, "Wireless, wearable, and wondrous tech," Jan. 17, 2003.

http://www.3G.co.uk, "NTT DoCoMo to Introduce First Wireless GPS Handset," Mar. 27, 2003.

"Physiological Monitoring System 'Lifeguard' System Specifications," Stanford University Medical Center, National Biocomputation Center, Nov. 8, 2002.

Nagl, L., "Wearable Sensor System for Wireless State-of-Health Determination in Cattle," Annual International Conference of the Institute of Electrical and Electronics Engineers' Engineering in Medicine and Biology Society, 2003.

Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.

Kumar, V., "The Design and Testing of a Personal Health System to Motivate Adherence to Intensive Diabetes Management," Harvard-MIT Division of Health Sciences and Technology, pp. 1-66, 2004.

U.S. Appl. No. 10/785,768, filed Feb. 24, 2004, Sinclair et al.

U.S. Appl. No. 10/724,008, filed Nov. 26, 2003, Zicheng et al.

U.S. Appl. No. 10/636,176, filed Aug. 7, 2003, Huang et al.

Zheng Y. et al., "Air and Bone-Conductive Integrated Microphones for Robust Speech Detection and Enhancement" Automatic Speech Recognition and Understanding 2003. pp. 249-254.

De Cuetos P. et al. "Audio-visual intent-to-speak detection for human-computer interaction" vol. 6, Jun. 5, 2000. pp. 2373-2376.

O.M. Strand, T. Holter, A. Egeberg, and S. Stensby, "On the Feasibility of ASR in Extremem Noise Using the PARAT Earplug Communication Terminal", ASRU 2003, St. Thomas, U.S. Virgin Islands, Nov. 20-Dec. 2003.

Australian Search Report and Written Opinion for Foreign Application No. SG 200500289-4 filed Jan. 18, 2005.

RD 418033, Feb. 10, 1999.

U.S. Appl. No. 10/698,324, filed Oct. 31, 2004, entitled "Personal Mobile Computing Device Having Antenna Microphone and Speech Detection for Improved Speech Recognition".

European Search report from Application No. 04025457.5, filed Oct. 26, 2004.

Written Opinion from Application No. SG 200500289-7, filed Jan. 18, 2005.

Chilean Office Action from Application No. 121-2005 filed Jan. 21, 2005.

EP Search Report Application No. 05101071.8-1246, dated Jul. 26, 2007.

* cited by examiner

MULTI-SENSORY SPEECH DETECTION SYSTEM

BACKGROUND OF THE INVENTION

The present invention relates to speech detection. More specifically, the present invention relates to detecting the presence of speech of a desired speaker based on a multi-sensory transducer input system.

In many different speech recognition applications, it is very important, and can be critical, to have a clear and consistent audio input representing the speech to be recognized provided to the automatic speech recognition system. Two categories of noise which tend to corrupt the audio input to the speech recognition system are ambient noise and noise generated from background speech. There has been extensive work done in developing noise cancellation techniques in order to cancel ambient noise from the audio input. Some techniques are already commercially available in audio processing software, or integrated in digital microphones, such as universal serial bus (USB) microphones.

Dealing with noise related to background speech has been more problematic. This can arise in a variety of different, noisy environments. For example, where the speaker of interest in talking in a crowd, or among other people, a conventional microphone often picks up the speech of speakers other than the speaker of interest. Basically, in any environment in which other persons are talking, the audio signal generated from the speaker of interest can be compromised.

One prior solution for dealing with background speech is to provide an on/off switch on the cord of a headset or on a handset. The on/off switch has been referred to as a "push-to-talk" button and the user is required to push the button prior to speaking. When the user pushes the button, it generates a button signal. The button signal indicates to the speech recognition system that the speaker of interest is speaking, or is about to speak. However, some usability studies have shown that this type of system is not satisfactory or desired by users.

In addition, there has been work done in attempting to separate background speakers picked up by microphones from the speaker of interest (or foreground speaker). This has worked reasonably well in clean office environments, but has proven insufficient in highly noisy environments.

In yet another prior technique, a signal from a standard microphone has been combined with a signal from a throat microphone. The throat microphone registers laryngeal behavior indirectly by measuring the change in electrical impedance across the throat during speaking. The signal generated by the throat microphone was combined with the conventional microphone and models were generated that modeled the spectral content of the combined signals.

An algorithm was used to map the noisy, combined standard and throat microphone signal features to a clean standard microphone feature. This was estimated using probabilistic optimum filtering. However, while the throat microphone is quite immune to background noise, the spectral content of the throat microphone signal is quite limited. Therefore, using it to map to a clean estimated feature vector was not highly accurate. This technique is described in greater detail in Frankco et al., *COMBINING HETEROGENEOUS SENSORS WITH STANDARD MICROPHONES FOR NOISY ROBUST RECOGNITION*, Presentation at the DARPA ROAR Workshop, Orlando, Fl. (2001). In addition, wearing a throat microphone is an added inconvenience to the user.

SUMMARY OF THE INVENTION

The present invention combines a conventional audio microphone with an additional speech sensor that provides a speech sensor signal based on an additional input. The speech sensor signal is generated based on an action undertaken by a speaker during speech, such as facial movement, bone vibration, throat vibration, throat impedance changes, etc. A speech detector component receives an input from the speech sensor and outputs a speech detection signal indicative of whether a user is speaking. The speech detector generates the speech detection signal based on the microphone signal and the speech sensor signal.

In one embodiment, the speech detection signal is provided to a speech recognition engine. The speech recognition engine provides a recognition output indicative of speech represented by the microphone signal from the audio microphone based on the microphone signal and the speech detection signal from the extra speech sensor.

The present invention can also be embodied as a method of detecting speech. The method includes generating a first signal indicative of an audio input with an audio microphone, generating a second signal indicative of facial movement of a user, sensed by a facial movement sensor, and detecting whether the user is speaking based on the first and second signals.

In one embodiment, the second signal comprises vibration or impedance change of the user's neck, or vibration of the user's skull or jaw. In another embodiment, the second signal comprises an image indicative of movement of the user's mouth. In another embodiment, a temperature sensor such as a thermistor is placed in the breath stream, such as on the boom next to the microphone, and senses speech as a change in temperature.

DETAILED DESCRIPTION OF ILLUSTRATIVE EMBODIMENTS

The present invention relates to speech detection. More specifically, the present invention relates to capturing a multi-sensory transducer input and generating an output signal indicative of whether a user is speaking, based on the captured multi-sensory input. However, prior to discussing the present invention in greater detail, an illustrative embodiment of an environment in which the present invention can be used is discussed.

Figure 1:
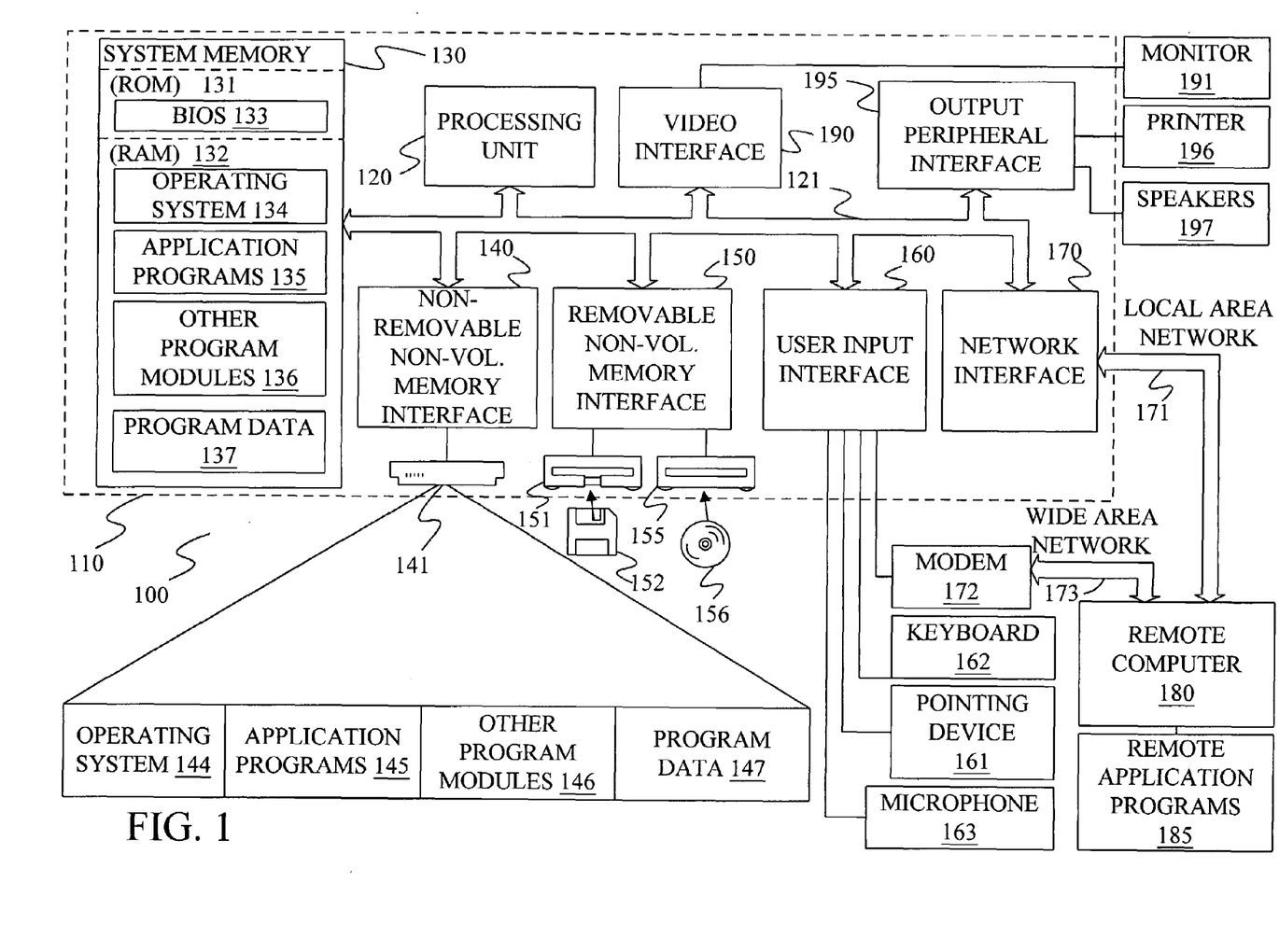
FIG. 1 is a block diagram of one environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both locale and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a locale area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
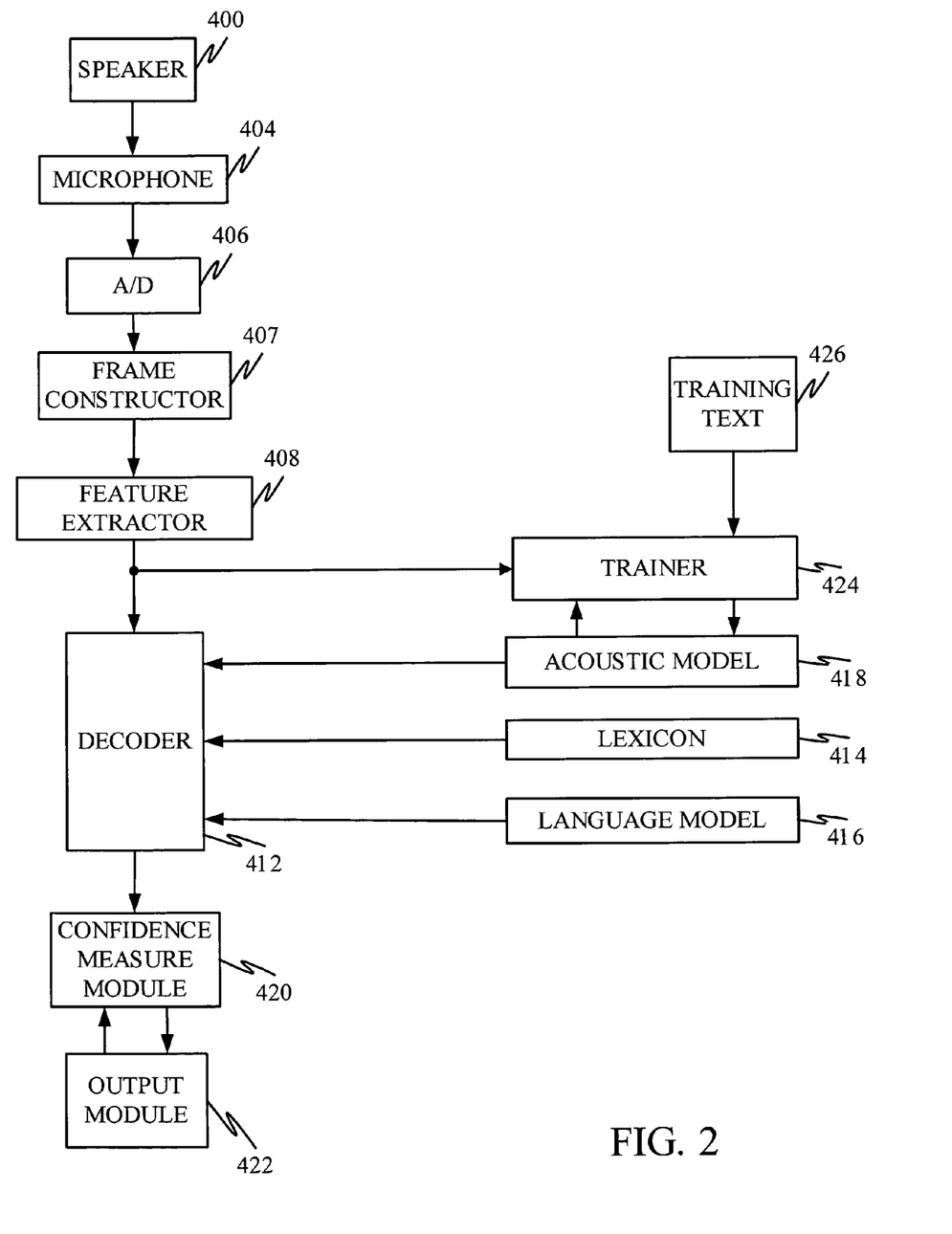
FIG. 2 is a block diagram of a speech recognition system with which the present invention can be used.

FIG. 2 illustrates a block diagram of an exemplary speech recognition system with which the present invention can be used. In FIG. 2, a speaker 400 speaks into a microphone 404. The audio signals detected by microphone 404 are converted into electrical signals that are provided to analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 408 produces a stream of feature vectors that are each associated with a frame of the speech signal. This stream of feature vectors is provided to a decoder 412, which identifies a most likely sequence of words based on the stream of feature vectors, a lexicon 414, a language model 416 (for example, based on an N-gram, context-free grammars, or hybrids thereof), and the acoustic model 418. The particular method used for decoding is not important to the present invention. However, aspects of the present invention include modifications to the acoustic model 418 and the use thereof.

The most probable sequence of hypothesis words can be provided to an optional confidence measure module 420. Confidence measure module 420 identifies which words are most likely to have been improperly identified by the speech recognizer. This can be based in part on a secondary acoustic model (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

During training, a speech signal corresponding to training text 426 is input to decoder 412, along with a lexical transcription of the training text 426. Trainer 424 trains acoustic model 418 based on the training inputs.

Figure 3:
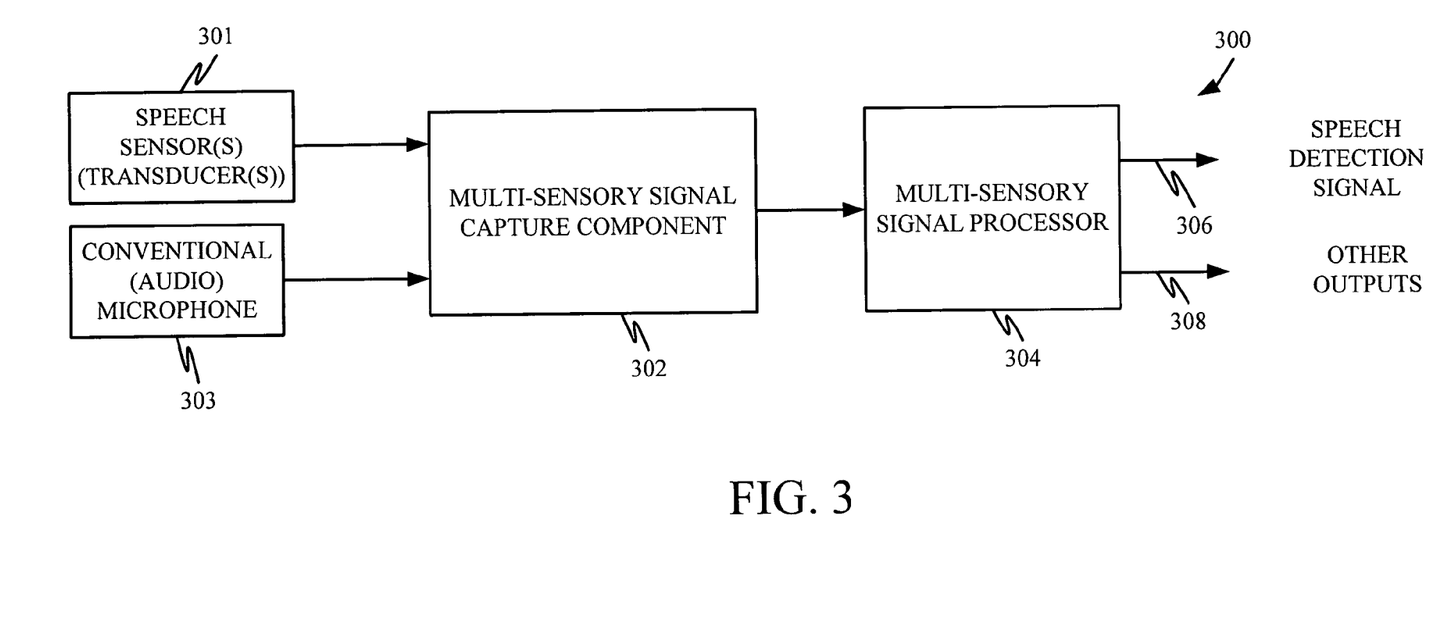
FIG. 3 is a block diagram of a speech detection system in accordance with one embodiment of the present invention.

FIG. 3 illustrates a speech detection system 300 in accordance with one embodiment of the present invention. Speech detection system 300 includes speech sensor or transducer 301, conventional audio microphone 303, multi-sensory signal capture component 302 and multi-sensory signal processor 304.

Capture component 302 captures signals from conventional microphone 303 in the form of an audio signal. Component 302 also captures an input signal from speech transducer 301 which is indicative of whether a user is speaking. The signal generated from this transducer can be generated from a wide variety of other transducers. For example, in one embodiment, the transducer is an infrared sensor that is generally aimed at the user's face, notably the mouth region, and generates a signal indicative of a change in facial movement of the user that corresponds to speech. In another embodiment, the sensor includes a plurality of infrared emitters and sensors aimed at different portions of the user's face. In still other embodiments, the speech sensor or sensors 301 can include a throat microphone which measures the impedance across the user's throat or throat vibration. In still other embodiments, the sensor is a bone vibration sensitive microphone which is located adjacent a facial or skull bone of the user (such as the jaw bone) and senses vibrations that correspond to speech generated by the user. This type of sensor can also be placed in contact with the throat, or adjacent to, or within, the user's ear. In another embodiment, a temperature sensor such as a thermistor is placed in the breath stream such as on the same support that holds the regular microphone. As the user speaks, the exhaled breath causes a change in temperature in the sensor and thus detecting speech. This can be enhanced by passing a small steady state current through the thermistor, heating it slightly above ambient temperature. The breath stream would then tend to cool the thermistor which can be sensed by a change in voltage across the thermistor. In any case, the transducer 301 is illustratively highly insensitive to background speech but strongly indicative of whether the user is speaking.

In one embodiment, component 302 captures the signals from the transducers 301 and the microphone 303 and converts them into digital form, as a synchronized time series of signal samples. Component 302 then provides one or more outputs to multi-sensory signal processor 304. Processor 304 processes the input signals captured by component 302 and provides, at its output, speech detection signal 306 which is indicative of whether the user is speaking. Processor 304 can also optionally output additional signals 308, such as an audio output signal, or such as speech detection signals that indicate a likelihood or probability that the user is speaking based on signals from a variety of different transducers. Other outputs 308 will illustratively vary based on the task to be performed. However, in one embodiment, outputs 308 include an enhanced audio signal that is used in a speech recognition system.

Figure 4:
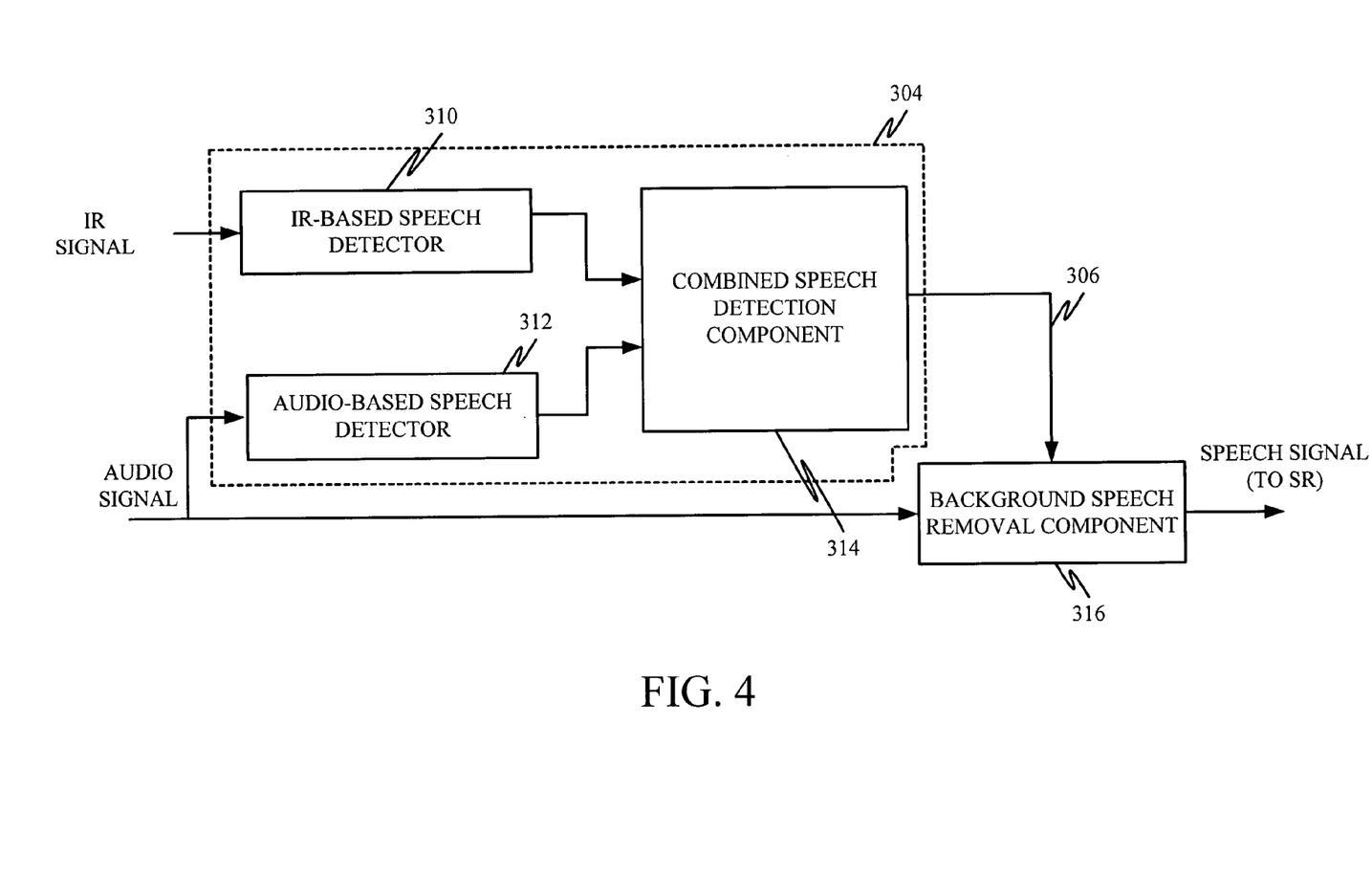
FIGS. 4 and 5 illustrate two different embodiments of a portion of the system shown in FIG. 3.

FIG. 4 illustrates one embodiment of multi-sensory signal processor 304 in greater detail. In the embodiment shown in FIG. 4, processor 304 will be described with reference to the transducer input from transducer 301 being an infrared signal generated from an infrared sensor located proximate the user's face. It will be appreciated, of course, that the description of FIG. 4 could just as easily be with respect to the transducer signal being from a throat sensor, a vibration sensor, etc.

In any case, FIG. 4 shows that processor 304 includes infrared (IR)-based speech detector 310, audio-based speech detector 312, and combined speech detection component 314. IR-based speech detector 310 receives the IR signal emitted by an IR emitter and reflected off the speaker and detects whether the user is speaking based on the IR signal. Audio-based speech detector 312 receives the audio signal and detects whether the user is speaking based on the audio signal. The output from detectors 310 and 312 are provided to combined speech detection component 314. Component 314 receives the signals and makes an overall estimation as to whether the user is speaking based on the two input signals. The output from component 314 comprises the speech detection signal 306. In one embodiment, speech detection signal 306 is provided to background speech removal component 316. Speech detection signal 306 is used to indicate when, in the audio signal, the user is actually speaking.

More specifically, the two independent detectors 310 and 312, in one embodiment, each generate a probabilistic description of how likely it is that the user is talking. In one embodiment, the output of IR-based speech detector 310 is a probability that the user is speaking, based on the IR-input signal. Similarly, the output signal from audio-based speech detector 312 is a probability that the user is speaking based on the audio input signal. These two signals are then considered in component 314 to make, in one example, a binary decision as to whether the user is speaking.

Signal 306 can be used to further process the audio signal in component 316 to remove background speech. In one embodiment, signal 306 is simply used to provide the speech signal to the speech recognition engine through component 316 when speech detection signal 306 indicates that the user is speaking. If speech detection signal 306 indicates that the user is not speaking, then the speech signal is not provided through component 316 to the speech recognition engine.

In another embodiment, component 314 provides speech detection signal 306 as a probability measure indicative of a probability that the user is speaking. In that embodiment, the audio signal is multiplied in component 316 by the probability embodied in speech detection signal 306. Therefore, when the probability that the user is speaking is high, the speech signal provided to the speech recognition engine through component 316 also has a large magnitude. However, when the probability that the user is speaking is low, the speech signal provided to the speech recognition engine through component 316 has a very low magnitude. Of course, in another embodiment, the speech detection signal 306 can simply be provided directly to the speech recognition engine which, itself, can determine whether the user is speaking and how to process the speech signal based on that determination.

Figure 5:
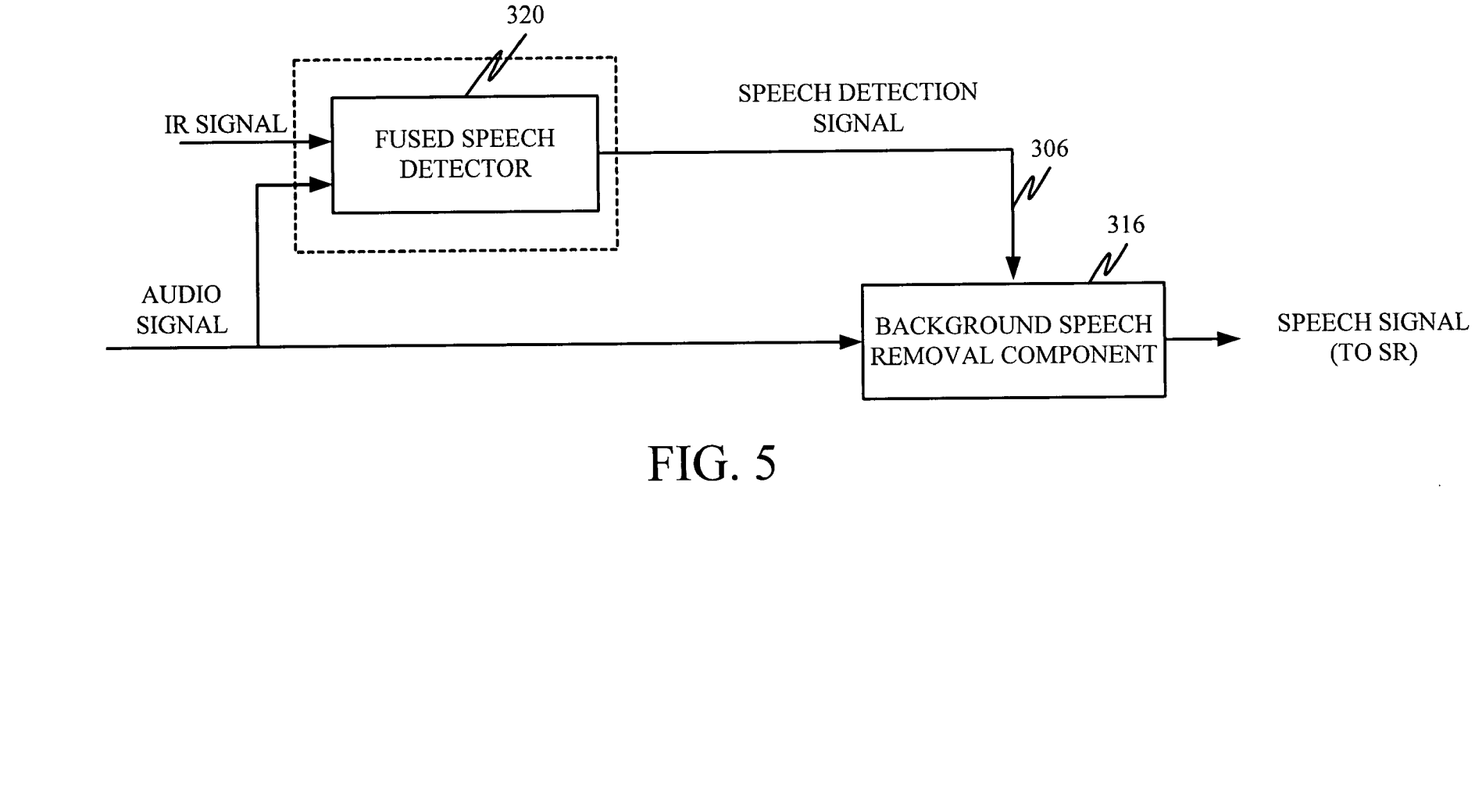

FIG. 5 illustrates another embodiment of multi-sensory signal processor 304 in more detail. Instead of having multiple detectors for detecting whether a user is speaking, the embodiment shown in FIG. 5 illustrates that processor 304 is formed of a single fused speech detector 320. Detector 320 receives both the IR signal and the audio signal and makes a determination, based on both signals, whether the user is speaking. In that embodiment, features are first extracted independently from the infrared and audio signals, and those features are fed into the detector 320. Based on the features received, detector 320 detects whether the user is speaking and outputs speech detection signal 306, accordingly.

Regardless of which type of system is used (the system shown in FIG. 4 or that shown in FIG. 5) the speech detectors can be generated and trained using training data in which a noisy audio signal is provided, along with the IR signal, and also along with a manual indication (such as a push-to-talk signal) that indicates specifically whether the user is speaking.

Figure 6:
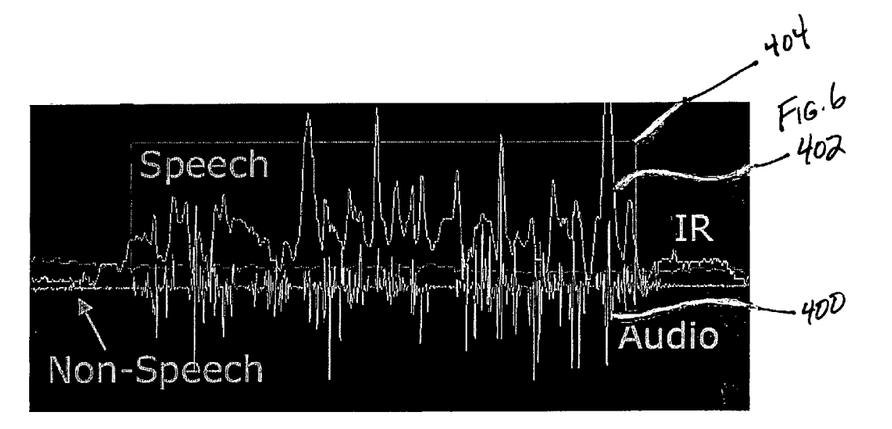
FIG. 6 is a plot of signal magnitude versus time for a microphone signal and an infrared sensor signal.

To better describe this, FIG. 6 shows a plot of an audio signal 400 and an infrared signal 402, in terms of magnitude versus time. FIG. 6 also shows speech detection signal 404 that indicates when the user is speaking. When in a logical high state, signal 404 is indicative of a decision by the speech detector that the speaker is speaking. When in a logical low state, signal 404 indicates that the user is not speaking. In order to determine whether a user is speaking and generate signal 404, based on signals 400 and 402, the mean and variance of the signals 400 and 402 are computed periodically, such as every 100 milliseconds. The mean and variance computations are used as baseline mean and variance values against which speech detection decisions are made. It can be seen that both the audio signal 400 and infrared signal 402 have a larger variance when the user is speaking, than when the user is not speaking. Therefore, when observations are processed, such as every 5-10 milliseconds, the mean and variance (or just the variance) of the signal during the observation is compared to the baseline mean and variance (or just the baseline variance). If the observed values are larger than the baseline values, then it is determined that the user is speaking. If not, then it is determined that the user is not speaking. In one illustrative embodiment, the speech detection determination is made based on whether the observed values exceed the baseline values by a predetermined threshold. For example, during each observation, if the infrared signal is not within three standard deviations of the baseline mean, it is considered that the user is speaking. The same can be used for the audio signal.

In accordance with another embodiment of the present invention, the detectors 310, 312, 314 or 320 can also adapt during use, such as to accommodate for changes in ambient light conditions, or such as for changes in the head position of the user, which may cause slight changes in lighting that affect the IR signal. The baseline mean and variance values can be re-estimated every 5-10 seconds, for example, or using another revolving time window. This allows those values to be updated to reflect changes over time. Also, before the baseline mean and variance are updated using the moving window, it can first be determined whether the input signals correspond to the user speaking or not speaking. The mean and variance can be recalculated using only portions of the signal that correspond to the user not speaking.

In addition, from FIG. 6, it can be seen that the IR signal may generally precede the audio signal. This is because the user may, in general, change mouth or face positions prior to producing any sound. Therefore, this allows the system to detect speech even before the speech signal is available.

Figure 7:
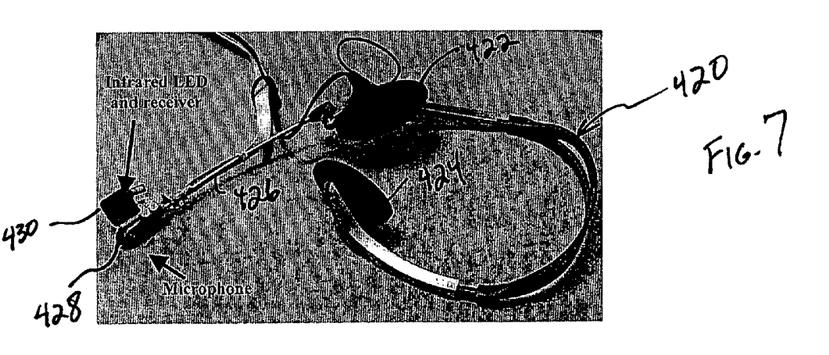
FIG. 7 illustrates a pictorial diagram of one embodiment of a conventional microphone and speech sensor.

FIG. 7 is a pictorial illustration of one embodiment of an IR sensor and audio microphone in accordance with the present invention. In FIG. 7, a headset 420 is provided with a pair of headphones 422 and 424, along with a boom 426. Boom 426 has at its distal end a conventional audio microphone 428, along with an infrared transceiver 430. Transceiver 430 can illustratively be an infrared light emitting diode (LED) and an infrared receiver. As the user is moving his or her face, notably mouth, during speech, the light reflected back from the user's face, notably mouth, and represented in the IR sensor signal will change, as illustrated in FIG. 6. Thus, it can be determined whether the user is speaking based on the IR sensor signal.

It should also be noted that, while the embodiment in FIG. 7 shows a single infrared transceiver, the present invention contemplates the use of multiple infrared transceivers as well. In that embodiment, the probabilities associated with the IR signals generated from each infrared transceiver can be processed separately or simultaneously. If they are processed separately, simple voting logic can be used to determine whether the infrared signals indicate that the speaker is speaking. Alternatively, a probabilistic model can be used to determine whether the user is speaking based upon multiple IR signals.

Figure 8:
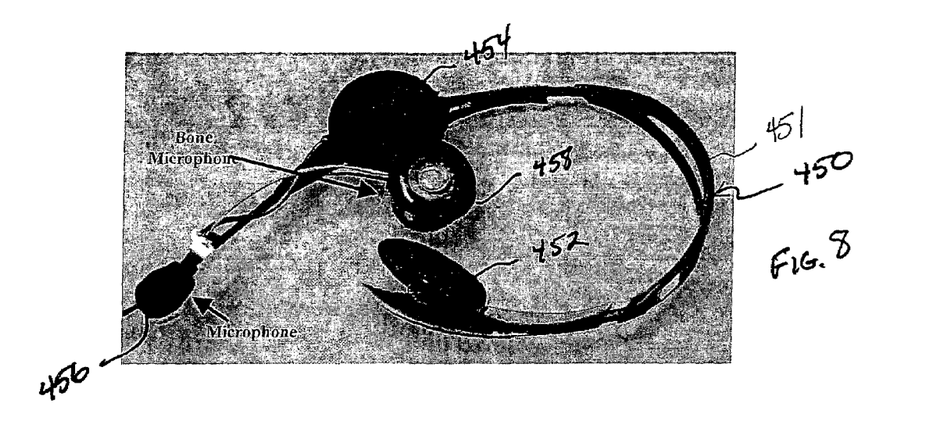
FIG. 8 shows a pictorial illustration of a bone sensitive microphone along with a conventional audio microphone.

As discussed above, the additional transducer 301 can take many forms, other than an infrared transducer. FIG. 8 is a pictorial illustration of a headset 450 that includes a head mount 451 with earphones 452 and 454, as well as a conventional audio microphone 456, and in addition, a bone sensitive microphone 458. Both microphones 456 and 458 can be mechanically and even rigidly connected to the head mount 451. The bone sensitive microphone 458 converts the vibrations in facial bones as they travel through the speaker's skull into electronic voice signals. These types of microphones are known and are commercially available in a variety of shapes and sizes. Bone sensitive microphone 458 is typically formed as a contact microphone that is worn on the top of the skull or behind the ear (to contact the mastoid). The bone conductive microphone is sensitive to vibrations of the bones, and is much less sensitive to external voice sources.

Figure 9:
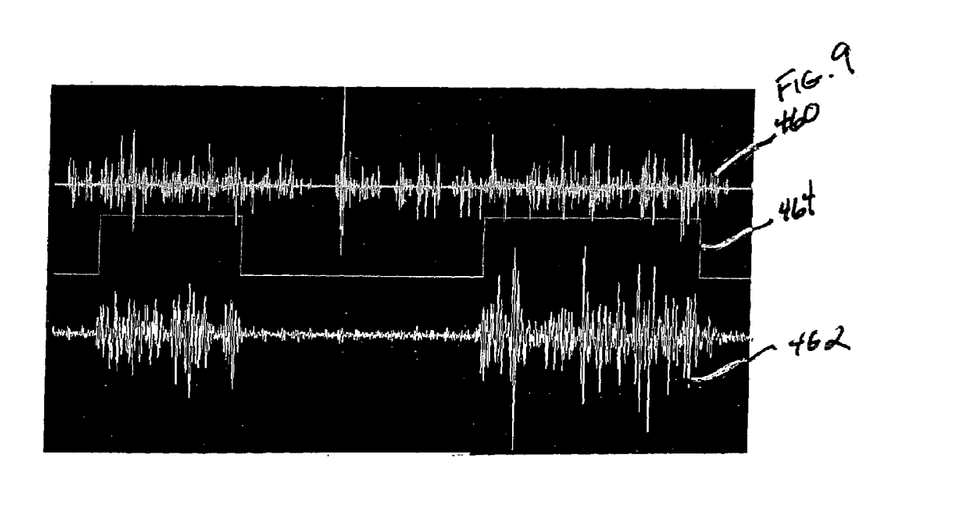
FIG. 9 is a plot of signal magnitude versus time for a microphone signal and audio microphone signal, respectively.

FIG. 9 illustrates a plurality of signals including the signal 460 from conventional microphone 456, the signal 462 from the bone sensitive microphone 458 and a binary speech detection signal 464 which corresponds to the output of a speech detector. When signal 464 is in a logical high state, it indicates that the detector has determined that the speaker is speaking. When it is in a logical low state, it corresponds to the decision that the speaker is not speaking. The signals in FIG. 9 were captured from an environment in which data was collected while a user was wearing the microphone system shown in FIG. 8, with background audio playing. Thus, the audio signal 460 shows significant activity even when the user is not speaking. However, the bone sensitive microphone signal 462 shows negligible signal activity accept when the user is actually speaking. It can thus be seen that, considering only audio signal 460, it is very difficult to determine whether the user is actually speaking. However, when using the signal from the bone sensitive microphone, either alone or in conjunction with the audio signal, it becomes much easier to determine when the user is speaking.

Figure 10:
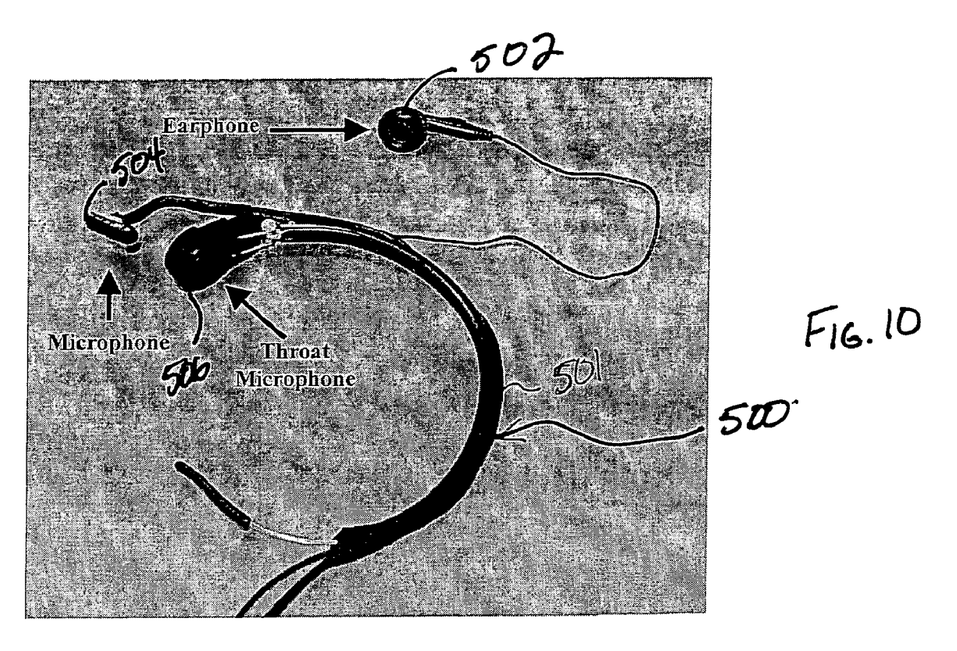
FIG. 10 shows a pictorial illustration of a throat microphone along with a conventional audio microphone.

FIG. 10 shows another embodiment of the present invention in which a headset 500 includes a head mount 501, an earphone 502 along with a conventional audio microphone 504, and a throat microphone 506. Both microphones 504 and 506 are mechanically connected to head mount 501, and can be rigidly connected to it. There are a variety of different throat microphones that can be used. For example, there are currently single element and dual element designs. Both function by sensing vibrations of the throat and converting the vibrations into microphone signals. Throat microphones are illustratively worn around the neck and held in place by an elasticized strap or neckband. They perform well when the sensing elements are positioned at either side of a user's "Adams apple" over the user's voice box.

While a number of embodiments of speech sensors or transducers 301 have been described, it will be appreciated that other speech sensors or transducers can be used as well. For example, charge coupled devices (or digital cameras) can be used in a similar way to the IR sensor. Further, laryngeal sensors can be used as well. The above embodiments are described for the sake of example only.

Another technique for detecting speech using the audio and/or the speech sensor signals is now described. In one illustrative embodiment, a histogram is maintained of all the variances for the most recent frames within a user specified amount of time (such as within one minute, etc.). For each observation frame thereafter, the variance is computed for the input signals and compared to the histogram values to determine whether a current frame represents that the speaker is speaking or not speaking. The histogram is then updated. It should be noted that if the current frame is simply inserted into the histogram and the oldest frame is removed, then the histogram may represent only the speaking frames in situations where a user is speaking for a long period of time. In order to handle this situation, the number of speaking and nonspeaking frames in the histogram is tracked, and the histogram is selectively updated. If a current frame is classified as speaking, while the number of speaking frames in the histogram is more than half of the total number of frames, then the current frame is simply not inserted in the histogram. Of course, other updating techniques can be used as well and this is given for exemplary purposes only.

The present system can be used in a wide variety of applications. For example, many present push-to-talk systems require the user to press and hold an input actuator (such as a button) in order to interact with speech modes. Usability studies have indicated that users have difficulty manipulating these satisfactorily. Similarly, users begin to speak concurrently with pressing the hardware buttons, leading to the clipping at the beginning of an utterance. Thus, the present system can simply be used in speech recognition, in place of push-to-talk systems.

Similarly, the present invention can be used to remove background speech. Background speech has been identified as an extremely common noise source, followed by phones ringing and air conditioning. Using the present speech detection signal as set out above, much of this background noise can be eliminated.

Similarly, variable-rate speech coding systems can be improved. Since the present invention provides an output indicative of whether the user is speaking, a much more efficient speech coding system can be employed. Such a system reduces the bandwidth requirements in audio conferencing because speech coding is only performed when a user is actually speaking.

Floor control in real time communication can be improved as well. One important aspect that is missing in conventional audio conferencing is the lack of a mechanism that can be used to inform others that an audio conferencing participant wishes to speak. This can lead to situations in which one participant monopolizes a meeting, simply because he or she does not know that others wish to speak. With the present invention, a user simply needs to actuate the sensors to indicate that the user wishes to speak. For instance, when the infrared sensor is used, the user simply needs to move his or her facial muscles in a way that mimics speech. This will provide the speech detection signal that indicates that the user is speaking, or wishes to speak. Using the throat or bone microphones, the user may simply hum in a very soft tone which will again trigger the throat or bone microphone to indicate that the user is, or wishes to, speak.

In yet another application, power management for personal digital assistants or small computing devices, such as palmtop computers, notebook computers, or other similar types of computers can be improved. Battery life is a major concern in such portable devices. By knowing whether the user is speaking, the resources allocated to the digital signal processing required to perform conventional computing functions, and the resources required to perform speech recognition, can be allocated in a much more efficient manner.

In yet another application, the audio signal from the conventional audio microphone and the signal from the speech sensor can be combined in an intelligent way such that the background speech can be eliminated from the audio signal even when the background speaker talks at the same time as the speaker of interest. The ability of performing such speech enhancement may be highly desired in certain circumstances.

Although the present invention has been described with reference to particular embodiments, workers skilled in the art will recognize that changes may be made in form and detail without departing from the spirit and scope of the invention.

What is claimed is:

1. A speech recognition system, comprising:
   an audio microphone outputting a microphone signal based on a sensed audio input;
   a speech sensor outputting a sensor signal based on a non-audio input generated by speech action;
   a speech detector component outputting a speech detection signal indicative of a probability that a user is speaking based on the microphone signal and based on a level of variance in a first characteristic of the sensor signal and based on the microphone signal, wherein the first characteristic of the sensor signal has a first level of variance when the user is speaking and a second level of variance when the user is not speaking and wherein the speech detector component outputs the speech detection signal based on the level of variance of the first characteristic of the sensor signal relative to a baseline level of variance of the first characteristic that comprises a level of a predetermined one of the first and second levels of the characteristic over a give time period the speech detection component further calculating a combined signal by multiplying the speech detection signal by the microphone signal; and
   a speech recognizer recognizing speech to provide a recognition output indicative of speech in the microphone signal based on the combined signal, wherein recognizing speech comprises:
   increasing a likelihood that speech is recognized by an amount based on a probability that the speech detection signal indicates that the user is speaking; and
   decreasing a likelihood that speech is recognized by an amount based on a probability that the speech detection signal indicates that the speaker is not speaking.

2. The speech detection system of claim 1 wherein the baseline level is calculated by averaging the level of the variance of the first characteristic over the time period.

3. The speech detection system of claim 1 wherein the baseline level is recalculated intermittently during operation of the speech detection system.

4. The speech detection system of claim 3 wherein the baseline level is recalculated periodically to represent the variance level of the first characteristic over a revolving time window.

5. The speech detection system of claim 3 wherein the speech detection component outputs the speech detection signal based on a comparison of the level of the variance of the first characteristic of the sensor signal to the baseline level, and wherein the comparison is performed periodically.

6. The speech detection system of claim 5 wherein the comparison is performed more frequently than the baseline level is recalculated.

7. The speech detection system of claim 1 wherein the audio microphone and the speech sensor are mounted to a headset.

8. A speech recognition system, comprising:
   a speech detection system comprising:
   an audio microphone outputting a microphone signal based on a sensed audio input;
   a speech sensor outputting a sensor signal based on a non-audio input generated by speech action; and
   a speech detector component outputting a speech detection signal indicative of a probability that a user is speaking based on the microphone signal and the sensor signal wherein the speech detector component calculates a combined signal by multiplying the speech detection signal by the microphone signal; and
   a speech recognition engine recognizing speech to provide a recognition output indicative of speech in the sensed audio input based on the combined signal;
   increasing a likelihood that speech is recognized by an amount based on a probability that the speech detection signal indicates that the user is speaking; and
   decreasing a likelihood that speech is recognized by an amount based on a probability that the speech detection signal indicates that the speaker is not speaking.

9. The speech recognition system of claim 8 wherein the audio microphone and the speech sensor being mounted on a headset.

10. A method of recognizing speech, comprising:
    generating a first signal, indicative of an audio input, with an audio microphone;
    generating a second signal indicative of facial movement of a user, sensed by a facial movement sensor;
    generating a third signal indicative of a probability that the user is speaking based on the first and second signals:
    generating a fourth signal by multiplying the probability that the user is speaking by the first signal; and
    recognizing speech based on the fourth signal and the speech detection signal, wherein recognizing speech comprises:
increasing a likelihood that speech is recognized by an amount based on a probability that the speech detection signal indicates that the user is speaking; and
decreasing a likelihood that speech is recognized by an amount based on a probability that the speech detection signal indicates that the speaker is not speaking.

11. The method of claim 10 wherein generating the second signal comprises:
sensing vibration of one of the user's jaw and neck.

12. The method of claim 10 wherein generating the second signal comprises:
sensing an image indicative of movement of the user's mouth.

13. The method of claim 10 and further comprising:
providing a speech detection signal based on detecting whether the user is speaking.

* * * * *

UNITED STATES PATENT AND TRADEMARK OFFICE
CERTIFICATE OF CORRECTION

PATENT NO. : 7,383,181 B2
APPLICATION NO. : 10/629278
DATED : June 3, 2008
INVENTOR(S) : Xuedong D. Huang et al.

It is certified that error appears in the above-identified patent and that said Letters Patent is hereby corrected as shown below:

In column 12, line 63, in Claim 10, delete "signals:" and insert -- signals; --, therefor.

Signed and Sealed this
Nineteenth Day of April, 2011

David J. Kappos
*Director of the United States Patent and Trademark Office*